(12) United States Patent
Xi et al.

(10) Patent No.: US 9,268,709 B2
(45) Date of Patent: Feb. 23, 2016

(54) STORAGE CONTROLLERS AND STORAGE CONTROL METHODS

(71) Applicant: MARVELL INTERNATIONAL LTD., Hamilton (BM)

(72) Inventors: Weiya Xi, Singapore (SG); Sufui Sophia Tan, Singapore (SG); Khai Leong Yong, Singapore (SG); Chun Teck Lim, Singapore (SG); Chao Jin, Singapore (SG); Zhi Yong Ching, Singapore (SG)

(73) Assignee: Marvell International LTD., Hamilton (BM)

( * ) Notice: Subject to any disclaimer, the term of this patent is extended or adjusted under 35 U.S.C. 154(b) by 172 days.

(21) Appl. No.: 14/056,330

(22) Filed: Oct. 17, 2013

(65) Prior Publication Data

US 2014/0115238 A1    Apr. 24, 2014

Related U.S. Application Data

(60) Provisional application No. 61/715,344, filed on Oct. 18, 2012.

(51) Int. Cl.
| | |
|---|---|
| *G06F 12/00* | (2006.01) |
| *G06F 13/00* | (2006.01) |
| *G06F 13/28* | (2006.01) |
| *G06F 12/12* | (2006.01) |
| *G06F 3/06* | (2006.01) |
| *G11B 27/36* | (2006.01) |
| *G11B 5/012* | (2006.01) |
| *G06F 12/02* | (2006.01) |

(52) U.S. Cl.
CPC ............... *G06F 12/12* (2013.01); *G06F 3/064* (2013.01); *G06F 3/0608* (2013.01); *G06F 3/0659* (2013.01); *G06F 3/0676* (2013.01); *G06F 12/0253* (2013.01); *G11B 5/012* (2013.01); *G11B 27/36* (2013.01)

(58) Field of Classification Search
CPC .... G11B 5/012; G11B 27/36; G06F 12/0253; G06F 2212/7205; G06F 2212/217
See application file for complete search history.

(56) References Cited

U.S. PATENT DOCUMENTS

| | | | | |
|---|---|---|---|---|
| 8,667,248 | B1 * | 3/2014 | Neppalli ........................ | 711/202 |
| 8,699,175 | B1 * | 4/2014 | Olds et al. .................... | 360/78.14 |
| 8,954,664 | B1 * | 2/2015 | Pruett et al. .................. | 711/112 |
| 2011/0304935 | A1 * | 12/2011 | Chang et al. .................. | 360/48 |
| 2012/0212847 | A1 * | 8/2012 | Sato et al. ..................... | 360/31 |
| 2012/0303928 | A1 * | 11/2012 | Hall .............................. | 711/172 |
| 2013/0198464 | A1 * | 8/2013 | Sharma ......................... | 711/157 |

OTHER PUBLICATIONS

Cassuto et al., "Indirection Systems for Shingled-Recording Disk Drives," 2010 IEEE 26th Symposium on Mass Storage Systems and Technologies (MSST), Conference at Incline Village, NV from May 3-7, 2010, pp. 1-14.

\* cited by examiner

*Primary Examiner* — Ryan Bertram

(57) ABSTRACT

According to various embodiments, a storage controller configured to control storage of data in a pre-determined area of a storage medium may be provided. The storage controller may include a memory configured to store a write pointer, a reclaim pointer, and a wrapped around pointer. The write pointer may indicate a location of the storage medium to write incoming data. The reclaim pointer may indicate a location of the storage medium to perform a space reclamation. The wrapped around pointer may indicate a location of the storage medium where writing is to continue if writing of data reaches an end of the pre-determined area.

21 Claims, 9 Drawing Sheets

| LBA (8 sectors) | Offset in NVM | Band ID | Block ID within Band |
|---|---|---|---|
| 0 | 0 | 0 | 10 |
| 8 | k | xx | xx |
| 16 | 2k | 20 (spare band) | 12 |
| 24 | 3k | 0 | 107 |
| ... | ... | ... | |

Sequential arrangement of LBA

LBA not written have invalid (xx) Band and Block ID

| LBA (8 sectors) | Offset in NVM | Band ID | Block ID within Band |
|---|---|---|---|
| 0 | 0 | 0 | 10 |
| 8 | 4 bytes | xx | xx |
| 16 | 2 x 4 bytes | 20 (spare band) | 12 |
| 24 | 3 x 4 bytes | 0 | 107 |
| ... | ... | ... | |

Arrangement in NVM, not metadata

Metadata stored in NVM

STORAGE CONTROLLERS AND STORAGE CONTROL METHODS

CROSS-REFERENCE TO RELATED APPLICATIONS

The present application claims the benefit of the U.S. provisional patent application No. 61/715,344 filed on 18 Oct. 2012, the entire contents of which are incorporated herein by reference for all purposes.

TECHNICAL FIELD

Embodiments relate generally to storage controllers and storage control methods.

BACKGROUND

Amounts of data to be stored are increasing. Thus, there may be a need for efficient storage of data.

SUMMARY

According to various embodiments, a storage controller configured to control storage of data in a pre-determined area of a storage medium may be provided. The storage controller may include a memory configured to store a write pointer, a reclaim pointer, and a wrapped around pointer. The write pointer may indicate a location of the storage medium to write incoming data. The reclaim pointer may indicate a location of the storage medium to perform a space reclamation. The wrapped around pointer may indicate a location of the storage medium where writing is to continue if writing of data reaches an end of the pre-determined area.

According to various embodiments, a storage control method of controlling storage of data in a pre-determined area of a storage medium may be provided. The storage control method may include controlling a memory to store a write pointer, a reclaim pointer, and a wrapped around pointer. The write pointer may indicate a location of the storage medium to write incoming data. The reclaim pointer may indicate a location of the storage medium to perform a space reclamation. The wrapped around pointer may indicate a location of the storage medium where writing is to continue if writing of data reaches an end of the pre-determined area.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which:

FIG. 8 and FIG. 9 show illustrations of the information that is required for the logical-to-physical mapping of the blocks according to various embodiments;

DESCRIPTION

Figure 1A:
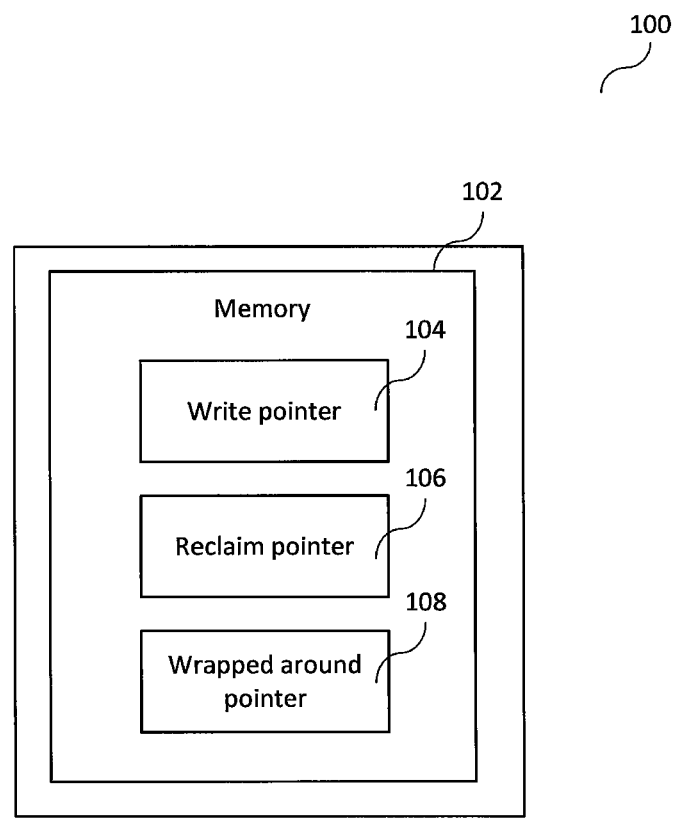
FIG. 1A and FIG. 1B show storage controllers according to various embodiments.

Embodiments described below in context of the devices are analogously valid for the respective methods, and vice versa. Furthermore, it will be understood that the embodiments described below may be combined, for example, a part of one embodiment may be combined with a part of another embodiment.

In this context, the storage controller as described in this description may include a memory which is for example used in the processing carried out in the storage controller. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

Amounts of data to be stored are increasing. Thus, there may be a need for efficient storage of data.

Hybrid disks may include both a rotating media and some faster non-volatile memory (NVM) for temporary and medium term/frequently accessed data storage. Most of the data may be stored on the rotating media and the capacity of the NVM is only a small percent of the capacity of the rotating media.

Hybrid disks may use the NVM to improve performance and/or reduce power consumption. Operating system data and some application data may be stored in the NVM to reduce boot up time. Frequently or currently accessed multimedia files may also be stored in the NVM for playback so that the rotating media may be powered down to decrease power consumption. Other data to be stored in the NVM may include runtime data and hybrid disks with shingled rotating media (or a shingled rotating medium) may store shingled management data in the NVM.

Shingled disks may increase the capacity by having more tracks. This may be done by having the tracks overlapped, in a shingled form. Depending on the size of the write head, when writing data to a track, subsequent adjacent tracks may be affected. To prevent overwriting of data, data may be written in an appending fashion or having those data that may be affected copied somewhere and then written back later.

Tracks on the shingled disks may be grouped into bands, with a band containing multiple contiguous tracks. Between bands, there may be provided guard areas which may not contain data. The guard areas may allow the last track of a band to be written without affecting tracks in the subsequent band.

To allow random writes on shingled disk, a shingled translation layer may be required. Data may be appended to the shingled disk and the shingled translation layer may map the logical location of the data to a physical location on the disk. When the data is updated, the new data may be appended to the disk, the old data may be invalidated, and the location of the data may be re-mapped to the new physical location.

Since old invalidated data may be left on the disk, the shingled translation layer may also provide a reclamation process to reclaim the space occupied by the invalid data. This may involve moving only the valid data from one location to another and updating the mapping of these data. According to various embodiments, a careful design of the shingled translation layer may be provided such that the mapping and cleaning of data do not impact the performance of the shingled disk too much.

According to various embodiments, a hybrid shingled writing disk may be provided. A hybrid shingled drive may include some amount of fast access non-volatile memory (NVM; in other words: solid state drive) as well as a rotating media that contains shingled tracks. Part of the NVM may be used for storing information/meta-data related to shingled data management. The disk may include a Hybrid Data Manager that may manage data between the NVM and the rotating media and a Shingled Translation Layer (STL) that handles data access to the shingled rotating media and maps logical address to physical location on the disk.

Tracks on shingled writing disks may be organized as multiple data bands of several contiguous shingled tracks with a guard band in between each data band to prevent the data writing in one band from affecting data in another. The shingled disk may also include one spare band with a fraction of the size of a regular band, for example to temporarily store data in case any of the data band cannot be cleaned in time to store further data.

Each track in the data band may be made up of multiple write units called data blocks, containing multiple contiguous sectors. The mapping of logical address to physical location by the STL may be done at the data block level. The meta-data for keeping the mapping information may be kept in the NVM together with other metadata required by the shingled translation layer. According to various embodiments, a full map with an entry for every logical block may be used, wherein the blocks may be sequentially arranged by LBA.

Each band may also maintain optional invalid block information that indicates which logical data addresses are being stored in each physical block within each data bands. The physical blocks may be arranged sequentially according to each data band for fast lookup. It may also be possible to get invalid block information of a data band by looking at the mapping table. If the shingled device have additional processing resource to generate the invalid block information when needed, invalid block information may not need to be kept in the NVM.

Each data band may also have its own metadata which is stored in the NVM, including a Write pointer and a Wrapped-Around point (or pointer). The write pointer may point to where the next data will be appended, and the Wrapped-Around point may indicate the point where writes can be wrapped around when the write pointer reaches the end of the band. The data band may also maintain a Reclaim pointer within each data band to indicate the data block where the next space reclamation routine will start scanning from. When writes wrapped around in the data band, new writes may be allowed as long as the distance between the data writing block and the next block to be reclaimed (indicated by Reclaim pointer) maintains a safe "guard distance".

A space reclamation routine may run periodically to free up spaces taken up by blocks that have been invalided. The space reclamation routine may start reclaiming blocks from the beginning of the band and like data writing, may be wrapped around once it reaches the end of the band. The reclamation process may read multiple tracks, for example 10 tracks, starting from the Reclaim pointer and then may append the valid blocks at where the Write pointer is. When reclaiming the spare band, blocks may be written back to their designated data band instead.

The reclamation routine may be interrupted by user request after reading/writing a track to limit the effect of the reclamation on the user response to reading or writing of one track. When the reclamation is interrupted during reading, the data read may be stored in the NVM and writing of these data may be issued as low priority requests to be process after the user requests.

The space reclamation routine may limit the copying of entire tracks of valid blocks and append them back to the band. When entire tracks of valid data are found at the top of the data band, those tracks may be designated as "inactive data" region. When new writes wrapped around, they may be appended to below the inactive region instead of starting from the top of the data band. This may make the cleaning routine more efficient by not moving lots of data when no invalid blocks can be freed. The reclamation routine may always start from the beginning of the data band regardless of whether it contains an "inactive data" region.

The reclamation routine may begin band selection and cleaning when the disk is I/O (input/output) idle and may only be activated when the disk is spinning. To maintain low power consumption, the reclamation routine may not spin up the disk to reclaim invalided blocks.

According to various embodiments, devices and methods for a shingled writing disk/shingled magnetic recording for a hybrid disk may be provided.

According to various embodiments, architecture designs and methods to store data in hybrid shingled writing disk may be provided.

FIG. 1A shows storage controller 100 according to various embodiments. The storage controller 100 may be configured to control storage of data in a pre-determined area of a storage medium. The storage controller 100 may include a memory 102 configured to store a write pointer 104, a reclaim pointer 106, and a wrapped around pointer 108. The write pointer 104 may indicate a location of the storage medium to write incoming data. The reclaim pointer 106 may indicate a location of the storage medium to perform a space reclamation. The wrapped around pointer 108 may indicate a location of the storage medium where writing is to continue if writing of data reaches an end of the pre-determined area.

In other words, the storage controller 100 may include pointers to locations on the storage medium of the storage device indicating where on the storage medium writing incoming data should be performed, where a space reclamation (procedure or process) should be performed, and where processing (writing or space reclamation) should continue of an end of an area, in which processing is performed, is reached.

Figure 1B:
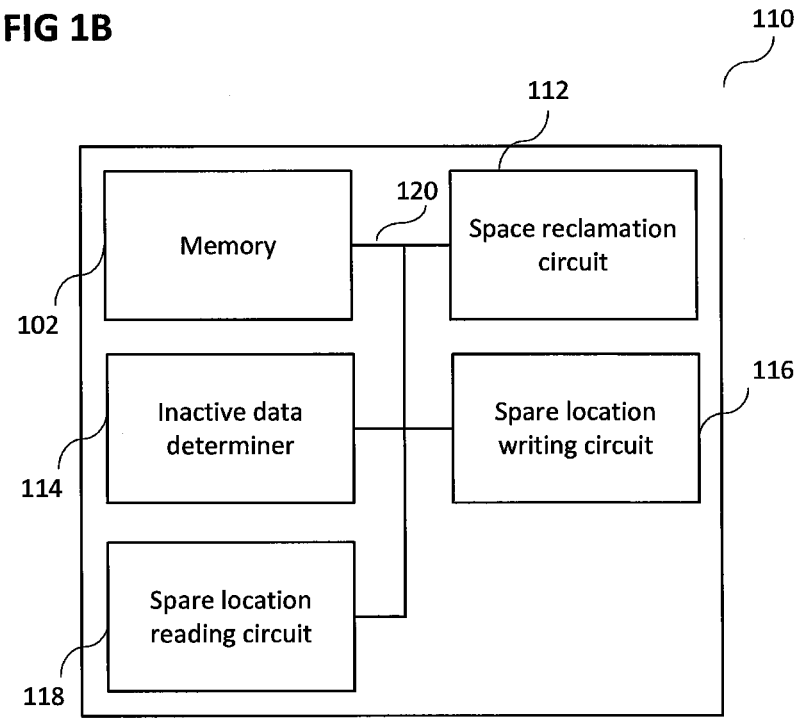

FIG. 1B shows a storage controller 110 according to various embodiments. Similar to the storage controller 100 of FIG. 1A, the storage controller 110 may include a memory configured to store a write pointer 104, a reclaim pointer 106, and a wrapped around pointer 108. The storage controller 110 may further include a space reclamation circuit 112, like will be described in more detail below. The storage controller 110 may further include an inactive data determiner 114, like will be described in more detail below. The storage controller 110 may further include a spare location writing circuit 116, like will be described in more detail below. The storage controller 110 may further include a spare location reading circuit 118, like will be described in more detail below. The memory 102, the space reclamation circuit 112, the inactive data determiner 114, the spare location writing circuit 116, and the spare location reading circuit 118 may be coupled with each other, like indicated by lines 120, for example electrically coupled, for example using a line or a cable, and/or mechanically coupled.

According to various embodiments, the space reclamation circuit 112 may be configured to read data at the location indicated by the reclaim pointer 106, may be configured to determine whether the data is outdated data (in other words: invalid data), and to write the data to the location indicated by the write pointer 104 if the data is not outdated data (in other words: if the data is valid data).

According to various embodiments, the space reclamation circuit 112 may further be configured to change the reclaim pointer 106 to indicate a location of the storage media after the location at which the data was read.

According to various embodiments, the space reclamation circuit 112 may further be configured to change the write pointer 104 to indicate a location of the storage media after the location at which the data was written if the data is not outdated data.

According to various embodiments, the inactive data determiner 114 may be configured to determine whether a region of non-outdated data is present at the beginning of the pre-determined area and further configured to change the wrapped around pointer 108 to a location after the region of non-outdated data if the region of non-outdated data is present at the beginning of the pre-determined area.

According to various embodiments, the spare location writing circuit 116 may be configured to write data to be written in the pre-determined region in a spare location of the storage medium if the space reclamation circuit 112 is not able to finish space reclamation before the data are to be written.

According to various embodiments, the spare location reading circuit 118 may be configured to read data from the spare location of the storage medium and write the data to the location indicated by the write pointer 104 after the space reclamation circuit 112 finished space reclamation.

According to various embodiments, the space reclamation circuit 112 may further be configured to continue space reclamation at the location indicated by the wrapped around pointer 108 if space reclamation of the space reclamation circuit 112 reaches the end of the pre-determined area.

According to various embodiments, the storage medium may include or may be a shingled rotating medium.

According to various embodiments, the memory may include or may be a non-volatile memory.

Figure 1C:
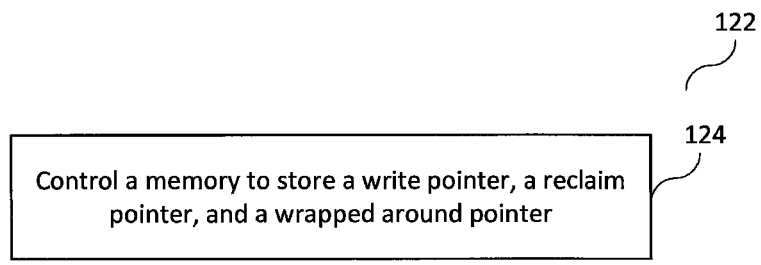
FIG. 1C shows a flow diagram illustration a storage control method.

FIG. 1C shows a flow diagram 122 illustrating a storage control method of controlling storage of data in a pre-determined area of a storage medium. In 124, a memory may be controlled to store a write pointer, a reclaim pointer, and a wrapped around pointer. The write pointer may indicate a location of the storage medium to write incoming data. The reclaim pointer may indicate a location of the storage medium to perform a space reclamation. The wrapped around pointer may indicate a location of the storage medium where writing is to continue if writing of data reaches an end of the pre-determined area.

According to various embodiments, the storage control method may further include: reading data at the location indicated by the reclaim pointer; determining whether the data is outdated data; and writing the data to the location indicated by the write pointer if the data is not outdated data.

According to various embodiments, the storage control method may further include: changing the reclaim pointer to indicate a location of the storage media after the location at which the data was read.

According to various embodiments, the storage control method may further include changing the write pointer to indicate a location of the storage media after the location at which the data was written if the data is not outdated data.

According to various embodiments, the storage control method may further include: determining whether a region of non-outdated data is present at the beginning of the pre-determined area; and changing the wrapped around pointer to a location after the region of non-outdated data if the region of non-outdated data is present at the beginning of the pre-determined area.

According to various embodiments, the storage control method may further include: writing data to be written in the pre-determined region in a spare location of the storage medium if the space reclamation is not able to be finished before the data are to be written.

According to various embodiments, the storage control method may further include: reading data from the spare location of the storage medium; and writing the data to the location indicated by the write pointer after the space reclamation is finished.

According to various embodiments, the storage control method may further include: continuing space reclamation at the location indicated by the wrapped around pointer if processing of the space reclamation reaches the end of the pre-determined area.

According to various embodiments, the storage medium may include or may be a shingled rotating medium.

According to various embodiments, the memory may include or may be a non-volatile memory.

A hybrid hard disk drive may include some relatively smaller amount of faster access non-volatile memory storage media to complement the slower but larger storage capacity of a rotational magnetic recording disk media. The fast non-volatile memory storage media may be in the form of memory chips embedded into the disk drive controller board.

Figure 2:
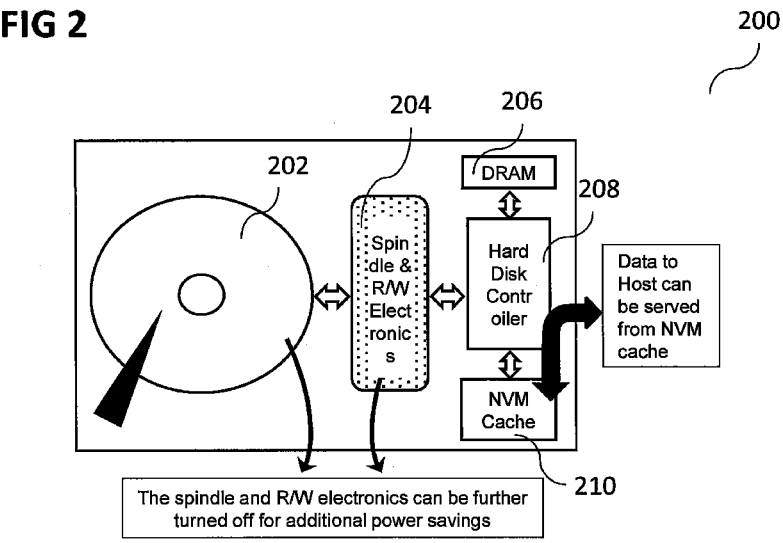
FIG. 2 shows an illustration the internals of a hybrid hard disk drive according to various embodiments.

FIG. 2 shows an overview of a hybrid hard disk drive 200 (which may also be referred to as hybrid drive). The hybrid hard disk drive 200 may include a magnetic media 202, a spindle and R/W (read/write) electronics 204, a DRAM (dynamic random access memory) 206, a hard disk controller 208, and a NVM (non-volatile memory) cache 210. The to a host may be served from NVM cache 210. The spindle and R/W electronics 204 may be further turned off for additional power saving.

Figure 3:
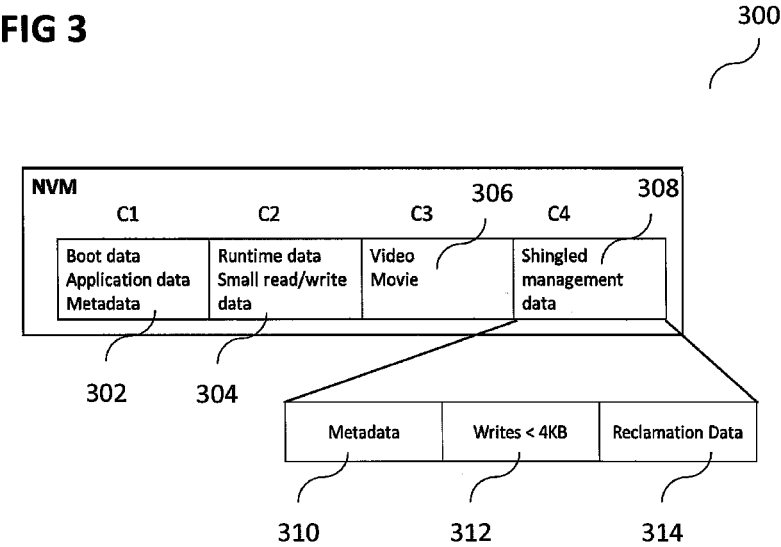
FIG. 3 shows different types of data that can be stored in the Non-volatile memory (NVM) of the hybrid shingled writing disk according to various embodiments.

FIG. 3 shows an illustration of data types in a non-volatile memory 300 according to various embodiments. In accordance with a non-volatile memory (NVM) management, a hybrid storage device may utilize the NVM for temporary and medium term/frequently accessed data storage, while transferring the data to the disk storage for long term storage. Four types of data may be stored in the NVM 300 to improve performance and/or reduce power consumption as shown in FIG. 3. The NVM 300 of the hybrid disk may be used to keep the following data types: boot data and frequently accessed applications 302, application runtime data and small read/write data 304, multimedia files 306 such as movies or songs that are frequently or currently accessed, and data and metadata 308 related to shingled management. The data and metadata 308 related to shingled management may include metadata 310, data 312 of less than 4 KB to be written, and reclamation data 314.

According to various embodiments, a hybrid shingled disk may be provided.

Figure 4:
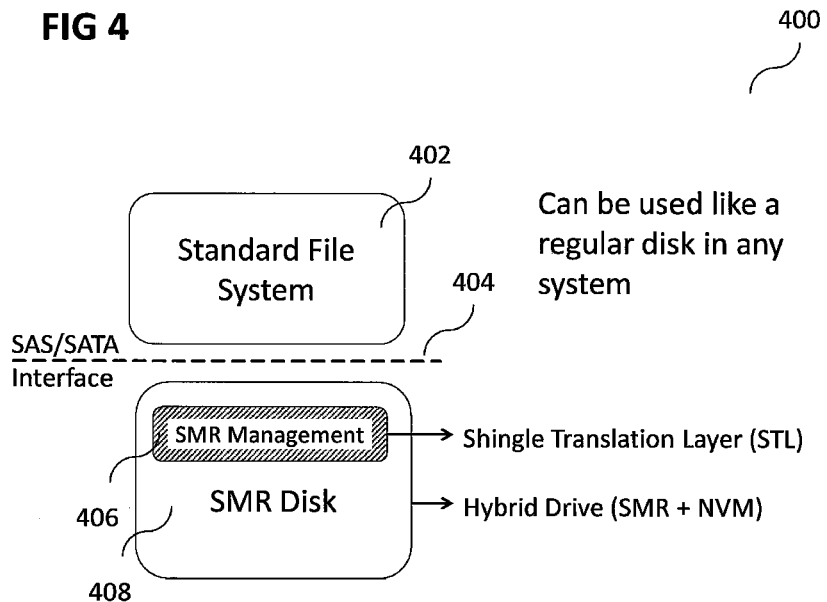
FIG. 4 shows an illustration of an overview of a hybrid shingled disk according to various embodiments.

FIG. 4 shows an illustration 400 of an overview of a hybrid shingled disk according to various embodiments. A standard file system 402 may, for example using a SAS/SATA (Serial Attached SCSI (small computer system interface)) Interface 404, access a SMR (shingled magnetic recording) disk 408, which may include a SMR management module 406. The standard file system 402 may use the SMR disk 408 like a regular disk in any system. The SMR disk 408 may be included in a hybrid drive which may for example include the SMR and a NVM (non-volatile memory; in other words: a solid state drive (SDD)). The SMR management module 406 may provide a Shingle Translation Layer (STL).

Figure 5:
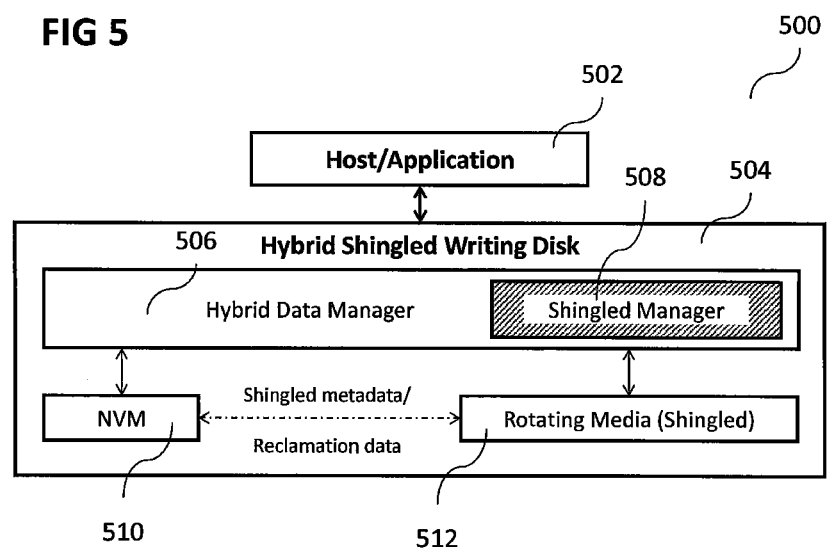
FIG. 5 shows a logical block diagram describing the architecture of the various components of the hybrid shingled writing disk according to various embodiments.

FIG. 5 shows an illustration 500 of the architecture of a hybrid shingled writing disk 504 according to various embodiments. The hybrid shingled writing disk 504 may include a hybrid data manager 506 which may manage access to an NVM 510 and to a shingled rotating media 512. The hybrid data manager 506 may decide if a read/write request is sent to the NVM 510 or the rotating media 512. The rotating/magnetic media 512 may have tracks that are shingled (in other words: partially over-lapping). The hybrid shingled writing disk 512 may also include a Shingled Manager 508 which may act as a Shingled Translation Layer (STL) to manage data on the shingled disk 512. The STL may adopt an address re-mapping data placement scheme which may map a logical address of a data to a physical location on the disk 512. When data is written to the shingled disk 512, the data may be appended to the disk 512 and the physical location where the data is appended may be mapped to the logical address of the data. To read back the data, the Shingled Manager 508 may look up the mapping and may issue a read for the physical location where the data resides. This mapping information may be stored as part of the shingled management metadata in the NVM 510 (and may for example be referred to as C4 in FIG. 3). Small writes may also be buffered in the NVM 510 before being flushed to the rotating media and appended to the disk 512. The Shingled Manager 508 may also include a space reclamation (in other words: garbage collection (GC)) routine to reclaim back the space occupied by data that have been invalidated when their logical address have been re-mapped to another physical location.

Alternatively, the rotating media 512 may also include a small portion of tracks that are non-shingled and may be randomly accessed just like the conventional hard disk. This may be similar to Banded drives where the rotating media contains both shingled and non-shingled tracks. The non-shingled portion may be used to store the shingled management data, metadata and buffering of small read/writes instead of using the NVM at the cost of some performance degradation.

The Shingled Manager (STL) 508 may perform data allocation, address mapping, invalid blocks tracking, and space reclamation.

According to the adopted hybrid disk architecture according to various embodiments, a 1 TB disk may need about 2 GB for shingled metadata. Shingled metadata may be accessed frequently and may be critical, so that a reliable storage with fast access may be used for shingled metadata. Shingled metadata may impact performance if stored on non shingled region of disk (for example, too much disk seeks may be performed.). According to various embodiments, NVM of the hybrid disk may be used to store metadata. The NVM may also be used for buffering of write data smaller than 4 KB and/or buffering of space reclamation data.

According to various embodiments, a shingled data layout, like will be described in the following, may be provided.

According to various embodiments, data may be provided in data bands, like will be described in the following.

Tracks on shingled writing disks may be organized as multiple data bands and each band may include multiple contiguous shingled tracks. A guard band may be arranged in between each data band to prevent the data writing to the current band from erasing data in its adjacent band. According to various embodiments, the data bands may or may have not the same size, the same number of tracks, and capacity may or may not vary from band to band. The data bands may be layout such that each band boundary is aligned to the track boundary and the bands are layout such that the first data band is on the outer most of the disk platter and the last data band is in the inner most of the platter.

According to various embodiments, a data band may be handled as circular log. According to various embodiments, with respect to data allocation, during reclamation valid data may be re-appended back to the same band, like will be described in more detail below. According to various embodiments, it may be determined how much over-provision in each data band should be provided. Space for un-writeable region when wrapped around may be provided. According to various embodiments, provisions may be provided to delay run-time reclamation. Some bands may be more frequently written/updated than others.

A small portion of the tracks in each data band may be used as over-provision which may be designed to improve the performance and not considered part of the capacity of the data band. A data band therefore may include more physical blocks than the amount of addressable logical blocks. The amount of over-provision in each band may be fixed or variable.

According to various embodiments, over provision in data bands may be provided. For example, 1% of the disk capacity may be provided as (over) provision for data bands, which may be distributed proportionately to all bands. Over-provision within each band may be 1% of the band size. Circular log, used for un-writable region, may be facilitated. More blocks update may be allowed. Runtime of reclamation may be delayed. For example, for a 10 GB data band, over-provision may be 100 MB (about 200 tracks or 25, 600 4 KB blocks).

The shingled disk may also include another over-provision in the form of a spare band. In some other shingled disks, there may be multiple spare bands that are left empty so that valid data from other bands can be copied over during the space reclamation process, which may be referred to as round-trip housekeeping routine. These spare bands may be similar to other bands and may have the same capacity.

According to various embodiments, the spare band may only be a fraction of the size of a regular band, and there may be only one spare band throughout the entire disk. The purpose of the spare band may be to temporarily store data in case any of the data band cannot be reclaimed in time to store further data. It may act as a form of insurance when the over-provision within the data band is unable to handle heavy write request for the data band.

According to various embodiments, about 1% to 1.5% of the disk capacity may be provided as a spare band, which may act as "extra insurance". For example, more active data band fills up faster (as every update may be a new append). It may be impossible to know which bands will be more active and allocate more provision. Therefore, a spare band may be a shared location to temporary hold data in case any data band cannot be appended in time, and may prevent runtime reclamation on very active band.

The total over-provision may amount to about 2% to 2.5% of the entire capacity of the rotating media, which may be less than the size of a regular data band. Part of this provision may be used to form the spare band and the others will be distributed among the data bands. Each data band may have about 1% of their tracks as over-provision, and the spare band may have a size of about 1% to 1.5% of the total capacity of the entire disk. As an example, a 1 TB rotating media can have about 20 data bands, each about 50.5 GB (including provision) and a spare band that is about 10 GB to 15 GB in size.

Figure 6:
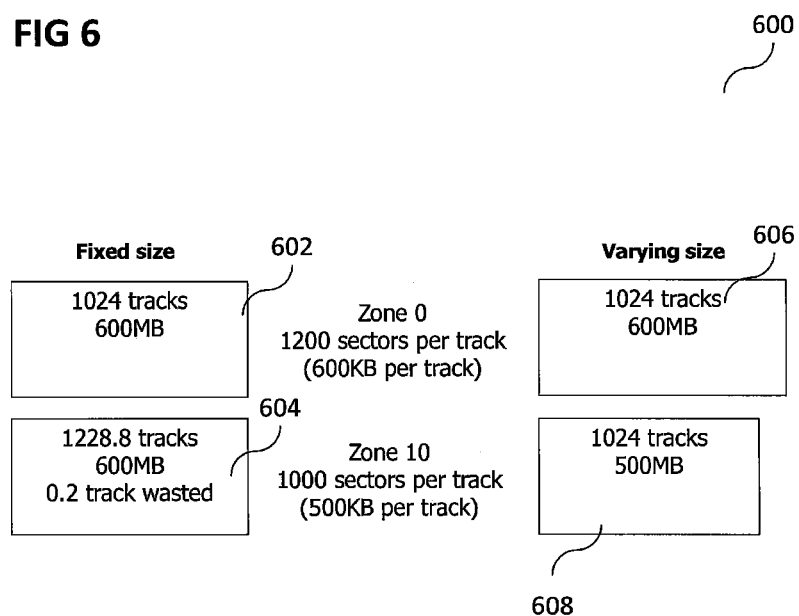
FIG. 6 shows an illustration of a data band design and layout according to various embodiments.

FIG. 6 shows an illustration 600 of a data band design and layout. Data bands may be of various sizes (which for example may be space efficient) with band boundary aligned to track boundary. A first band may be provided on outer most tracks, and a last band may be provided on inner most tracks (similar to traditional HDD). Block 602 and 604 show an example of a number of tracks required if data band size is adopted to be 600 MB fixed for all the zones inside a disk drive. Block 602 shows 1024 tracks required for zone 0 which has 1200 sectors per tracks. Block 604 shows 1228.8 tracks required for zone 10 which has 1000 sectors per track. The actual tracks required is 1229 and the last 0.2 track will be wasted. A case where the disk drive adopts a variable sized data band design is shown in block 606 and 608, meaning that for zone 0, the data band size is 600 MB while for zone 10 the data band size is 500 MB. Block 608 shows that if 500 MB is chosen as the band size, exactly 1024 tracks are need for 500 MB, and no space will be wasted.

Figure 7:
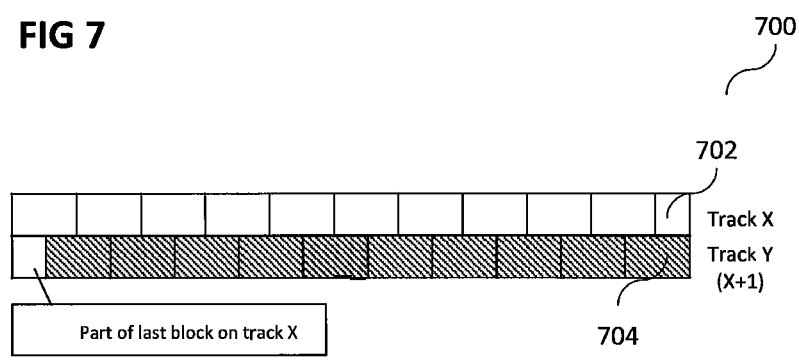
FIG. 7 shows an illustration of how a track is divided into various data blocks and how partial blocks form up a logical track according to various embodiments.

In the following, data track and data blocks according to various embodiments will be described. Each track in the band may be made up of multiple write units called data blocks, and each block may include or may consist of multiple contiguous sectors. If a track does not contain exact multiple of blocks, the partial of the block on the next track is consider to belong to the previous track (like shown in FIG. 7, which shows an illustration 700 of blocks that form a logical track, wherein two adjacent tracks 602 and 604 are shown, and the first partial block of the subsequent track 604 is considered a part of the last block of the previous track 602). However, if the last block in the data band is not a complete block, the partial block may be discarded as "roll-over" to the guard band area may not be allowed. Capacity wasted by the discarded last partial blocks may be negligible when the block size is small, since the number of bands in the disk is not large. Data tracks in a band may try to follow as closely to the physical track as possible but may not be restricted by the physical geometry. Tracks within a data band may not be the same number of data blocks per track due to the "roll-over" of partial data blocks.

According to various embodiments, handling of 4 KB blocks may be provided on tracks. Management of track in a data band may always be in multiple of 4 KB. Roll over partial blocks onto next physical track may be provided. However, no roll over for the last partial block in the band may be provided.

The mapping of logical address to physical location by the Shingled Manager may be done at the data block level; therefore, the larger the block size, the lesser the metadata required to keep track of the logical-to-physical mapping. However, the mapping may be at a coarser granularity and more buffering in the NVM may be needed for small writes before a data block can be appended to the rotating media. An example size of a block may be 4 KB and 8 sectors.

In the following, data allocation according to various embodiments will be described. According to various embodiments, data may be allocated to the data bands sequentially, with the smallest addresses allocated to the first data band and the largest addresses allocated to the last data band. This may provide a preservation of some form of locality and similarity to the way data are layout in conventional hard disks.

According to various embodiments, allocation to bands may be provided by LBA (logical block address) range (which may for example preserve locality, like HDD). The smallest LBA may be allocated in a first data band, and the largest LBA in a last data band. This may prevent contiguous LBA written in different time to be appended in different data band and may lead to cross data bands seeks when reading. Valid data re-appended back to the same band during space reclamation may be provided.

According to various embodiments, metadata for shingled data management may be provided. Each data block may include data associated with some contiguous sectors of logical addresses. The logical addresses of the shingled disk may be divided into blocks of similar size and each of these logical blocks may have a corresponding mapping to a physical block on the disk. The mapping information may be stored in the NVM together with other metadata required by the shingled translation layer. The physical mapping may be broken down in to Band ID and Block ID within the band. According to various embodiments, a full map with an entry for every logical block may be provided and used. To prevent scanning through the mapping table when looking up the physical location of a logical block, the mapping information may be kept at specific address in the NVM sorted according to the logical block address (LBA).

According to various embodiments, metadata for address re-mapping scheme may be designed to use a full direct map. One entry for each address mapped may be provided, and may be accessed directly without scanning through mapping table. This may allow fast access and updates. For example, addresses may be mapped in 4 KB blocks. A map by sector results in large metadata. Writes of less than 4 KB may be cached in NVM and appended later.

FIG. 8 shows an illustration 800 of a structure of logical-to-physical mapping tables. In a first table 802, an offsets in the NVM are assigned to LBA in a sequential arrangement of LBA. The first table may be implicitly provided by the arrangement of the data in the NVM, and may not be actual metadata. In a second table 804, an assignment of the LBA (given for example implicitly by the offset in NVM as illustrated in the first table 802) to Band ID and block ID within the band. The second table 804 may be metadata stored in the NVM. LBA which are not written may have an invalid band and block ID, for example "xx".

FIG. 8 shows the structure of the mapping table given a 4 KB block size (8 sectors of LBA). The LBA of the logical block may be sequentially arranged, and therefore may not be stored as part of the metadata. For example if the mapping table is stored at address 00xxaa00 in the NVM, and each mapping entry requires k bytes, then the location where the band-block information are stored will be at the following address in the NVM.

| | |
|---|---|
| LBA 0 | 00xxaa00 |
| LBA 8 | 00xxaa00 + k bytes offset |
| LBA 16 | 00xxaa00 + 2k bytes offset |

FIG. 9 shows an illustration 900 of the mapping information as shown in FIG. 8, wherein k=4.

According to various embodiments, the mapping information may be sequentially arranged by every 4 KB of LBA. For example, for a 1 TB disk with 16 data bands, 1 GB of mapping data may be provided.

Write requests smaller than the block size may be buffered in the NVM (see area C4 in FIG. 3) and appended to the disk when the entire block is in the NVM or during periodic flushing of NVM data to the media.

Each band may also maintain optional invalid block information at a designated memory location in the NVM as described with reference to FIG. 10.

Figure 10:
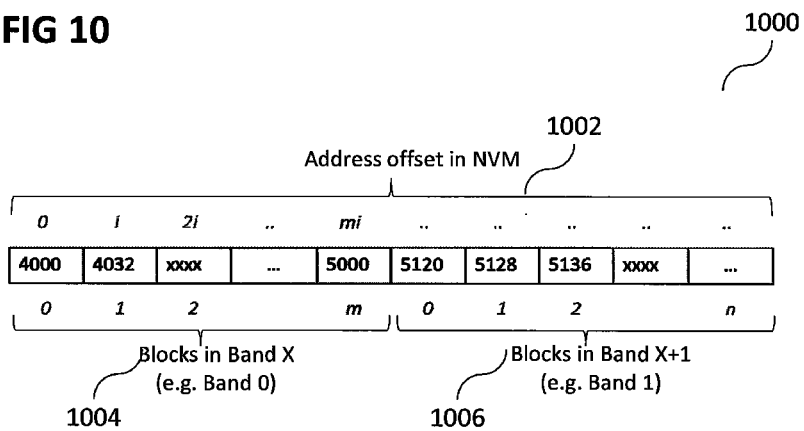
FIG. 10 shows an illustration of the invalid block information for indicating which blocks in the data bands contain invalid/valid information according to various embodiments.

FIG. 10 shows an illustration 1000 of a layout of invalid block information in NVM according to various embodiments. The invalid block information may be sequentially arranged by band and block, for example like indicated by 1004 for blocks in a band X (for example band 0), and in 1006 for a subsequent band X+1 (for example band 1). An address offset in NVM may be given, like indicated by 1002. The invalid block information may store LBA at specific blocks, and may be used for reclamation. For example for a 1 TB disk with 16 Data Band, 1 GB invalid block data may be provided.

The (invalid block) information may indicate which logical data addresses are being stored in each physical block within each data bands. The physical blocks may be arranged sequentially according to each data band and block for fast lookup. The "xxxx" may indicate an invalid LBA address, which may be used to denote that the data at that particular block has been invalidated. When data is appended as a physical block to the disk (eg. Block 2 in Band X), the starting logical address of the data that is being appended will be store in the location that reflects that physical block. The invalid block information is used by the space reclamation routine to update the mapping table in FIG. 8 when a particular block is being copied elsewhere.

Since data are allocated sequentially, it may also be possible to get invalid block information of a data band by looking at the mapping table (as shown in FIG. 8). For example, if m blocks of data are allocated to band 0 and next n blocks of data are allocated to band 1, invalid block information of band 1 may be generated by getting n entries starting from the $m^{th}$ entry from the mapping table. The entries can then be sorted by band-block ID and the original position of the entry may indicate the LBA, while those entries without valid Band-Block ID may be considered invalid blocks. If the shingled device has additional processing resource to generate the invalid block information as and when needed, then the space required in the NVM for storing shingled management metadata may be reduced by not storing invalid block information in the NVM.

For 4 KB write unit size, each entry may be represented by 4 Bytes (Band ID uses 1 Byte, Block ID uses 3 Bytes, LBA uses 4 Bytes). To allow Block ID to be represented with 3 Bytes, each data band should not be more than 64 GB when the block size is 4 KB. For a 1 TB disk, the capacity required for storing the mapping table and invalid block information may be around 2 GB since each of the structures has 1TB/4 KB number of entries.

In the following, management within a data band according to various embodiments will be described.

In the following, appending data according to various embodiments will be described.

Figure 11:
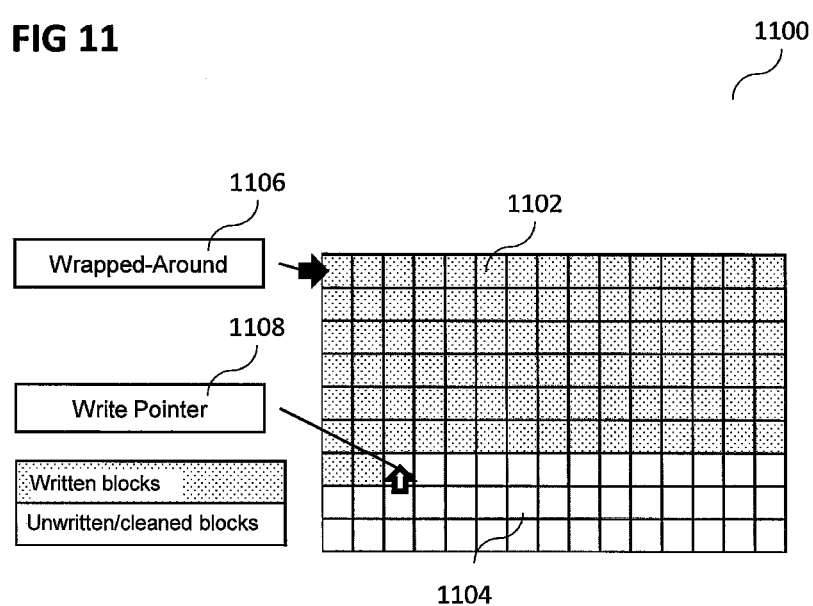
FIG. 11 shows that a data band contains a write pointer to indicate where to append the next block and a wrapped-around point for indicating where to wrapped around new appends when the end of the data band is reached according to various embodiments.

FIG. 11 shows an illustration 1100 of appending data according to various embodiments. For example, processing for one data band is shown in FIG. 11. Each data band may have its own metadata which may be stored in the NVM, including a Write pointer 1108 and a Wrapped-Around point 1106. Data appended to the data band may be written to where the write pointer 1108 points to. The position of the write pointer 1108 may be moved whenever data blocks are appended to the data band and may always indicate the block where the next data will be appended. The Wrapped-Around point 1106 may indicate the point where writes may be wrapped around when the write pointer 1108 reaches the end of the band and is set initially as the beginning of the data band. Written blocks 1102 are shown as blocks filled with doth. Unwritten (or cleaned) blocks 1104 are shown as empty blocks.

In the following, wrapped around writes according to various embodiments will be described. In a conventional data band management, when the data band is fully written, no data will be allowed to be written to the band until the whole data band is completely cleaned by the space reclamation routine. According to various embodiments, the data bands may be cleaned in portions and new data may be written to partially cleaned data bands. This may be done by maintaining a Reclaim pointer within each data band to indicate the data block where the next reclamation routine will start scanning from. As shown FIG. 11 above, after writing the last block of the data band, the write pointer 1108 may wrap around and repositions to the Wrapped-Around point 1106 to continue with the data writing. Writes may be allowed as long as the distance between the data writing block and the next block to be reclaimed (indicated by a reclaim pointer as will be described in more detail below) maintains a safe "guard distance" such that the data write will not erase previously written region that have not been reclaimed by the reclamation routine. The "guard distance" may be similar to the area formed by the fixed guard band between two data bands. Storage space utilization efficiency may be increased since the "un-writable" region is the "guard distance" instead of an entire data band.

Figure 12:
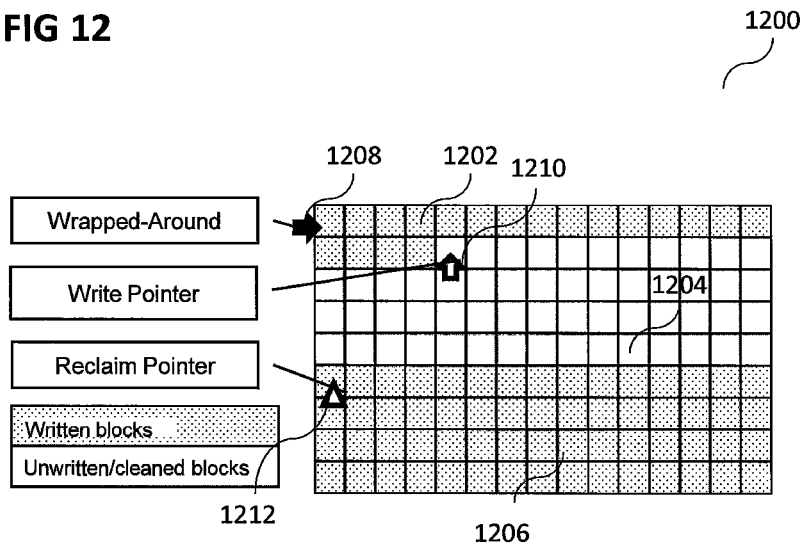
FIG. 12 shows a data band that has been partially reclaimed and writes that has been wrapped around according to various embodiments.

FIG. 12 shows an illustration 1200 of a data band, illustrating wrapped around write to a reclaimed area of the data band. FIG. 12 shows a data band that is partially reclaimed and data writes that have wrapped around. A reclaim pointer 1212 may indicate where the previous reclamation routine ended. Should the reclamation be unable to reclaim and free up blocks in time to allow new writes into the data band, data may be temporary written to the spare band and copied back to the designated data band later. Similar to FIG. 11, a wrapped around point 1208, and a write point 1210 are shown. Written blocks 1202 and 1206 are shown as blocks filled with dots. Unwritten (or cleaned) blocks 1204 are shown as empty blocks.

In the following, space reclamation within a data band according to various embodiments will be described. Data may be written to the data band in an appending fashion and the old blocks (in other words: blocks, in which data that is deleted or re-written was stored) may be invalided. This may result in many invalid blocks within the data band. These invalid blocks may never be accessed but take up space. Therefore, there may be a need to periodically free up areas occupy by these invalid blocks. Written blocks in the data band may be read and the valid blocks may be appended as new writes back to the data band, and the area previously occupied by those blocks may be freed up and be available for use. The Reclaim pointer in the data band may keep track of where the next reclaim will begin and also may mark where the previous reclaim ends at.

The space reclamation routine may start reclaiming from the beginning of the band and like data writing, may wrap around once it reaches the end of the band. The reclamation routine may read multiple tracks, for example 10 tracks, starting from the reclaim pointer and then may append the valid blocks at where the write pointer is. If the data band being reclaimed is the spare band, then the valid blocks are appended back to their designated band instead. Should there be an incoming user request during the reclamation process; the reclamation routine may interrupt the reading/appending process after completing reading/writing the current track to allow the user request to proceed. The effect of the reclamation on the user response may thus be limited to the reading or writing of one track. When the reclamation routine is interrupted during reading, the data blocks read may be stored in the NVM and writing of these blocks may be issued as low priority requests to be process after the user requests. When the reclamation routine is interrupted during a read (e.g. after reading 4 tracks), it may not continue with reading of more tracks once the process resumes, instead, the reclamation routine may ensure those data blocks that have been read and stored in the NVM are written to the disk before beginning another round of read and append.

Since data allocation may be by logical addresses, it may be possible that a data band contains both active and inactive data. Inactive data are those that are not updated and therefore blocks associated with them remains valid once written. According to various embodiments, the space reclamation routine may be efficient by limiting the copying of entire tracks of valid data blocks and appending them back to the band. This may be done by setting the top part of a band as "inactive data" region and moving the Wrapped-Around point to lower part of the band just below the "inactive data" region. Whenever the reclamation routine begins from the beginning of the band, there may be a chance that the "inactive data" region can be determined and the Wrapped-Around point set. If the reclamation routine discovered that the top few tracks contain only valid data blocks, then those tracks are left intact (see for example FIG. 13A, like will be described below). The first track from the beginning of a band that contains invalid blocks may be the track that the reclamation routine will start reclaiming and where the Wrapped-Around point will be set subsequently. When the Write pointer wrapped around, it may begin at the position indicated by the Wrapped-Around point instead of the beginning of the data band as shown in FIG. 13B below.

Once the Reclaim pointer reaches the end of the data band, it may start scanning from the beginning of the data band and re-determine if the Wrapped-Around point needs to be reset. If the previous "inactive data" have invalid blocks, then the reclamation may start from the first track that contains invalid blocks and the Wrapped-Around point adjusted accordingly. "Inactive data" that have been slowly gathered at the top of the band may ensure that the space reclamation routine works more efficiently by skipping tracks of valid data when reclaiming invalid data blocks from the data bands.

Figure 13A:
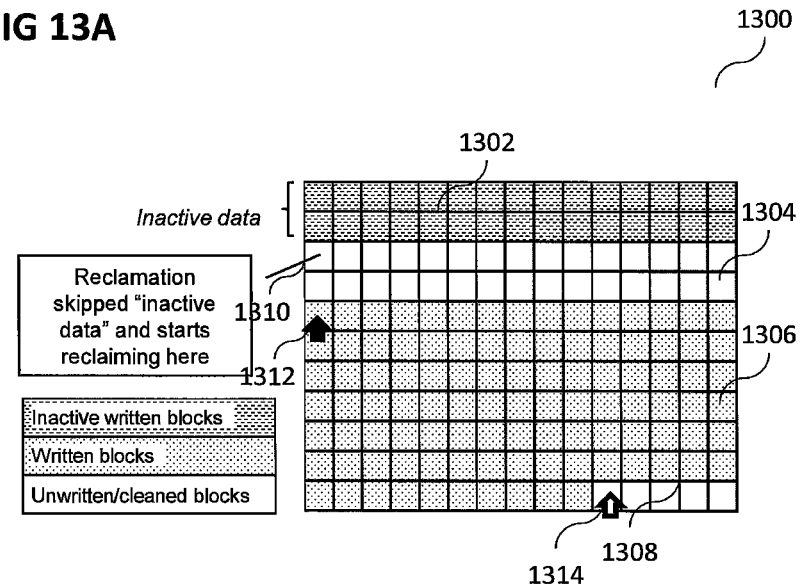
FIGS. 13A and 13B illustrate how inactive data is kept at the top of the data band and reclaim and new appends begins after the inactive data region according to various embodiments.

FIG. 13A shows an illustration 1300 of inactive data 1302 (illustrated by hatched blocks) skipped by the reclamation routine. Reclamation of the inactive data 1302 may be skipped, and reclamation may start after the inactive data, like indicated by 1310. Similar to FIGS. 11 and 12, the reclaim pointer 1312, and the write pointer 1314 are shown. Written blocks 1306 are shown as blocks filled with dots. Unwritten (or cleaned) blocks 1304 and 1308 are shown as empty blocks. Blocks with inactive data 1302 (in other words: inactive written blocks) are shown as blocks filled with dashes (in other words: filled with horizontal lines).

Figure 13B:
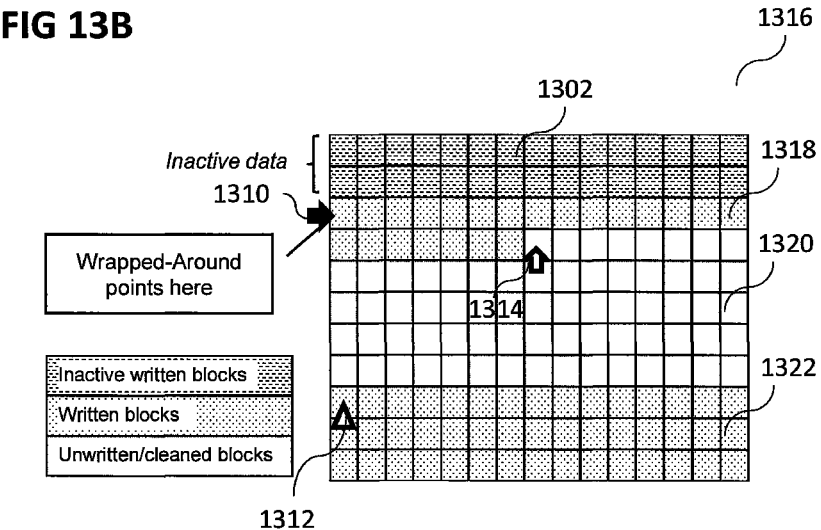

FIG. 13B shows an illustration 1316 of write wrapped around at the wrapped-around point. Like in FIG. 13A, inactive data 1302 (indicated by blocks with horizontal lines), the write point 1314, and the reclaim pointer 1312 are shown. The wrapped-around point 1310 may be (directly) after the inactive data 1302. Written blocks 1318 and 1322 are indicated by blocks filled with dots, and unwritten (or cleaned) blocks 1320 are illustrated by empty blocks.

The track based space reclamation routine according to various embodiments may be used from 1 to n (with an integer number n) number of tracks (for example 10 tracks). It may stop after finish reading/writing current track when user requests arrive to make the best use of each rotation. It may limit impact on user request to at most 1 track read/write. Valid data blocks read may be temporarily stored in NVM and may be appended back to data band immediately if I/O idle, otherwise process after user requests.

According to various embodiments, an "Inactive data" region within a data band may be provided. It may be created during reclaim process. Data may be set as "inactive" data if all blocks on the corresponding track are valid and skipped when reclaiming the track. The wrapped-around point may be set below (or after) "inactive" area so writes may skip the "inactive" area. "Inactive data" may be Re-check every time the space reclamation process wraps around. No request history may be required to determine "inactive" data. The "inactive data" region may only be at beginning of a data band.

The inactive data region may reduce moving of large chunks of data while reclaiming only little or no invalid blocks (in other words: may reduce inefficiency), and may reduce reclamation time especially when disk/band is near full.

Example savings from "Inactive data" region may be as follows. A 0.5 GB movie file may be stored across about 1000 tracks. It may be a read-only file, therefore no invalid blocks; each reclaim cycle may be 10 tracks. The movie file may require 100 reclaim cycles to move/re-write it. Each 10 track reclaim cycle may include 10 tracks read and 10 tracks write, 18 single track switch, and 1 half data band seek. A total of 2.5 sec may be used per cycle. So for 100 reclaim cycles, about 4 min may be used.

According to various embodiments, a data band for reclaiming invalid data blocks may be selected. The shingled disk may include multiple data bands and the space reclamation routine may select a data band to reclaim. The reclamation routine begins band selection and reclaiming when the disk is I/O idle. To maintain low power consumption, the reclamation routine may be active only when the disk is spinning. If the disk has gone into power down mode, the reclamation routine may not spin up the disk to do reclamation. The reclamation routine may selects a data band for reclaiming (in other words: for performing reclamation) based on the following order:

1) Least % of writable blocks;
2) Most % of invalid+% of blocks in spare band;
3) Band closest to current read/write head.

Writable blocks may refer to blocks that can be written safely. When the write pointer has wrapped around, writable blocks may take into account the blocks making up the "guard distance" between the write pointer and the reclaim pointer.

According to various embodiments, a "guard distance" may be provided which has similar use as the "floating band" mention above. "guard distance" is a distance which could be in terms of number sectors/tracks within a data band to prevent data over-writing. To determine whether the data can be appended to the write pointer, it may be desired to check that the distance between the current write block and the append pointer (in other words: reclaim pointer) where there are kept valid data is bigger than the "guard distance". If not (in other words: if the distance is not provided), it is not allowed to write as this may erase valid data on the disk. Or else (if the distance is provided), it is allowed to write. The distance between the current write location to the append pointer keeps on changing as the reclamation process can claim more space, in addition, data can be kept on appending to the write pointer. Both of them can cause the "guard distance" or "guard band" to keep on moving within the data band, therefore it is like a "floating band". However, the "guard distance" may not be a full data band, but rather a few tracks within a data band to prevent over-writing of data within the data band. This may save space by disallowing writes only to area that may be over-written due to the size of the write head, rather than wasting entire band as "guard".

The spare band according to various embodiments may be configured to temporary hold data when the data band cannot be written safely. This may happen when there are too many updates in the same data band such that the over-provision is used up and the reclamation routine cannot reclaim invalid data blocks in the band in time. Data written to the spare band may be moved back to their respective data band only during the reclamation of the spare band. A disk may have only one spare band or a plurality of spare bands.

According to various embodiments, devices and methods may be provided for determining how the fixed range of addresses can be divided into the multiple section, for example, by dividing disk addresses into bands sequentially. The data bands may be layout on the disk from outer to inner diameter, such that smaller addresses may be in bands near the outer diameter and larger addresses may be in bands near the inner diameter. This may be to follow as closely as possible to the way convention disk arrange physical block address (PBA).

According to various embodiments, if the writes are big enough, they may be appended sequentially to the band in data block units. This may improve efficiency by writing data once and allows sequential writes for large requests.

According to various embodiments, track based space reclamation may be provided. There may be a maximum number of tracks to clean during each reclamation, but this number may be lesser if there are incoming user requests. This may ensure that user response is not impacted too greatly during space reclamation, and that the reclamation routine may be more efficient by allowing large sequential read and write during when disk is I/O idle.

According to various embodiments, mixed hot and cold (active and inactive) data in the same data band may be provided, and the bands may be of varying sizes.

According to various embodiments, there may be no need to keep track of past write request to identify hot data. A regular space reclamation routine and time to "filter" the inactive data to the top of the band and "freezing" the portion may be provided to reduce a need to reclaim inactive data blocks.

The identification of hot and cold data according to various embodiments may be to have different garbage collection/space reclamation methods for data bands containing different types of data. A space reclamation method may be provided, in which the creation of inactive data region may be to reduce inefficient reclamation effort in moving large chunks of inactive data when such effort does not reclaim and free up much invalid blocks.

According to various embodiments, a shingled magnetic recording medium may be provided which may be used like traditional HDD (hard disk drive). It may have a comparable performance and minimum cost. A data management scheme may be provided. Writing and updating (RMW or Address re-mapping) may be provided. The impact of reclamation (for example when disk is near full) may be reduced. A metadata design may be provided for fast access (for example for searching and/or updating) at low size (for example to be kept in NVM).

A track based data band design may be provided. A metadata design may be provided for log based, address re-mapping data placement. Provision and spare bands may be provided. Managing data band as circular log may be facilitated. Run-time reclamation on very active data bands may be reduced. A space reclamation method may be provided. The impact to user requests during reclamation may be limited. Reclamation time may be reduced when disk/band is near full.

According to various embodiments, a log based, address remapping data placement may be provided. It may not cause large write amplification like read-modify-write scheme. Blocks with data updated may be invalidated and may be reclaimed periodically. Data bands may be managed as circular log. They may be partially cleaned while still in use. Not necessarily extra data bands may be needed for garbage collection/space reclamation (i.e. there is no need to move valid blocks to another band to free up a band).

According to various embodiments, an address re-mapping scheme may be provided. Metadata for address mapping and invalid block information for space reclamation may be provided. Efficient space reclamation methods may be provided.

According to various embodiments, provision may be provided. According to various embodiments, capacity wastage by provision may be reduced. Capacity wastage according to various embodiments compared to method using extra bands will be described in the following, e.g. for a 1 TB disk with 20 data bands with each about 50 GB. A method requiring extra bands for space reclamation may using 2 Extra Bands (i.e. 100 GB), which may be 10% of 1 TB According to various embodiments, band provision and spare band may make up only about 2.5% of 1 TB.

According to various embodiments, variable data band sizes may allow maximum tracks and blocks to be used. Metadata may be kept as full direct map in NVM. Fast and direct access with scanning of mapping table may be provided. A hybrid structure with NVM for buffering small writes and reclamation data may be provided. Two layers of over provision (with less than about 2.5% of the disk capacity) may be provided. Every band may have some provision. A shared band as extra insurance may be used by any band. According to various embodiments, there may be no need for an extra band for reclamation.

According to various embodiments, a track based reclamation method may be provided. "Inactive data" regions to improve space reclamation efficiency may be determined. No analysis of historic requests may be needed to identify inactive regions.

In the following, computations and calculations with respect to various embodiments will be described.

NVM storage required for Mapping Table (4 KB write unit size) may be as follows:

Band ID: 1 Byte ($2^8$, 0~255);
Block ID: 3 Bytes ($2^{24}$, 0~16,777,215).

The maximum number of representable entries in a data band may be 16,777,216 entries. When each entry (block) represents 4 KB, a maximum size in a data band may be 16,777,216*4 KB=64 GB.

Storage required for storing mapping of one data band may be 16,777,216*4 Byte=64 MB. 1TB capacity may require 16 data bands, and the total storage for mapping may be 16*64 MB=1 GB.

NVM storage required for Invalid Block Information (for LBA by 4 KB) may be as follows:

LBA: 4 Byte ($2^{32}$, 0~4,294,967,295 sectors).
1 sector may include 512 Byte.

The maximum number of sectors for 1TB capacity may be 1TB/512 Byte=2,147,483,648 sectors.

Block size may be 4 KB, therefore LBA may be stored for every 8 sectors. 1 TB may be broken down into 268,435,456 of 8 sectors/4 KB.

Storage required for storing invalid block information may be 268,435,456*4 Byte=1 GB.

Computations for over-provision will be described in the following.

A total of about 2 to 2.5% of capacity may be used for over-provision. For 1TB capacity, about 20 to 25 GB may be used for over-provision.

1% of the capacity may be allotted to data bands for over-provision. For 64 GB data band, additional provision may be about 640 MB, equivalent to about 163,840 4 KB data blocks.

About 1 to 1.5% of the capacity may be allotted to a spare band. The spare band may have a capacity of about 10 to 15 GB, which may be about 16% to 24% of the size of a data band.

In the following, computations with respect to a creation (or definition) of "inactive data" regions according to various embodiments will be described. For example, a video file with about 0.5 GB in size, and each track having about 0.5 MB capacity may be considered.

The video may be stored across about 1000 tracks. If each reclaim cycle is 10 tracks, 100 reclaim cycles may be required to scan through the region occupied by the video file.

If the video file is a read only movie file, no blocks may be invalidated (as there may be no updates), and each reclaim cycle may read 10 tracks and append the 10 tracks. This may translate to:

a) 10 tracks read+10 tracks write;
b) 18 single track seek (9 for reading, 9 for writing); and
c) 1½ data band seek (assuming that the write pointer is ½ data band away from reclaim pointer).

If the tracks occupied by the video file are considered the "inactive data" region, the total savings may be 100 reclaim cycles.

In the following, a Comparison of search complexity for entries stored in different structures will be described. n may denote the number of entries in table. O(x) may denote the big O notation (which may also be referred to as Landau notation), and may mean that the order of magnitude O(x) is not much bigger than x.

For a hash table, there may be a best case of O(1), and a worst case of O(n).

Only mapping of LBA that is already on disk may be kept, and the number of entry may depend on how much data may be written to the disk.

For a direct map, the complexity may be of O(log n). Only mapping of LBA that is already on disk may be kept, and the number of entries may depend on how much data is written to disk. Assuming entries are already sorted, it only may be scanned for an entry. When all entries exist on the map (which may mean that the map becomes a full direct map), search may become O(1). If the entries are not sorted, finding an entry may require linear search, which may be O(n).

For a full direct map, complexity may be O(1). An entry of the mapping for all possible LBA may be kept on disk, regardless if that data has been written to disk. According to various embodiments, wastage may be maximum 7 sectors (3.5 KB) per data Band, which may add up to less than 70 KB if the disk has 20 Bands. This may be in addition to the 2.5% over-provision.

A multilevel map may provide a complexity in the best case of O(k), where k may be the number of levels. Only mapping of LBA that is already on disk may be kept, and the number of levels may be fixed regardless of the number of data written to disk. (for example may be $1^{st}$ level look for the Band Id, $2^{nd}$ level look for the Block Id. According to various embodiments, the metadata design may be a full direct map. The multilevel map may be an alternative according to various embodiments. For metadata designed to keep the information of bandID and blockID, a two level map and searching may be provided. When searching for particular block/LBA, it may be desired to look for bandID first, which may be called the $1^{st}$ level search. Once the bandID has allocated, blockID has to be found out from the particular band. Here, this may be referred to as the $2^{nd}$ level search. Time complexity may depend on what type of map is implemented at each level, and the best case may be when every level is O(1).

Figure 14:
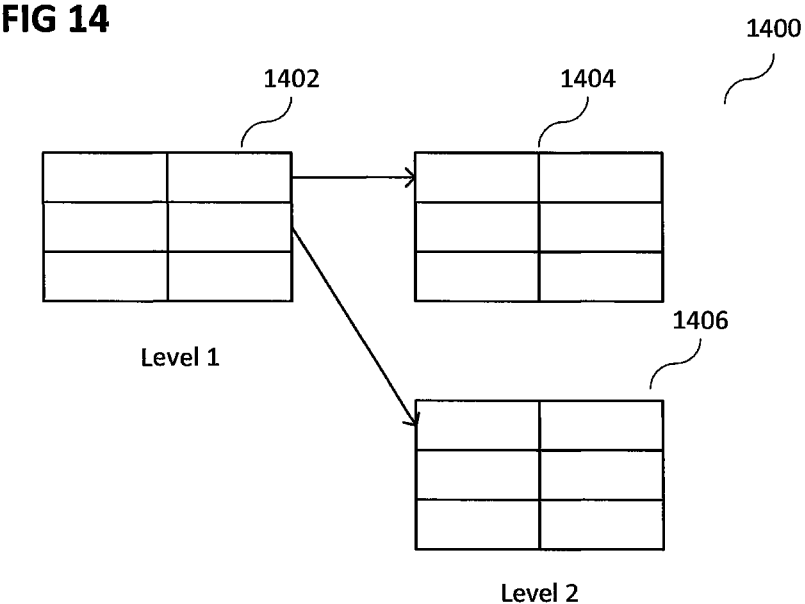
FIG. 14 shows an illustration of a multilevel map according to various embodiments.

FIG. 14 shows an illustration 1400 of a multilevel map. A map 1402 for a first level is shown, and maps 1404 and 1406 for a second level are shown.

Other structures (except full direct map) may include a savings of storage space used. The size occupied may depend on number of entries in the Map/Table. A full direct map may already have space reserved for all entries; therefore the size may be fixed.

In the following, a capacity wastage of fixed size data band according to various embodiments will be described. A difference in the sectors per track between the $1^{st}$ and last zone of a disk may be 40%. For simplicity, a constant difference of 30 sectors per track (spt) between each zone may be assumed. For example, a disk may include 20 Zones. The number of sectors per track may be as follows:

Zone 0=2000 spt;
Zone 1=1970 spt;
Zone 2=1940 spt; . . . and
Zone 19=1430 spt.

A data band size of 50 GB may be assumed. Furthermore assuming that the entire band fits into a zone, space wasted for each band in that zone may be like stated in Table 1.

TABLE 1

| Zone Band is in | KB/Track in Zone | Number of tracks used for Band | KB on last track of Band Used | Wasted |
|---|---|---|---|---|
| 0  | 1000 | 52429 | 800 | 200 |
| 1  | 985  | 53228 | 205 | 780 |
| 2  | 970  | 54051 | 300 | 670 |
| 3  | 955  | 54900 | 255 | 700 |
| 4  | 940  | 55776 | 300 | 640 |
| 5  | 925  | 56680 | 725 | 200 |
| 6  | 910  | 57615 | 60  | 850 |
| 7  | 895  | 58580 | 595 | 300 |
| 8  | 880  | 59579 | 160 | 720 |
| 9  | 865  | 60612 | 285 | 580 |
| 10 | 850  | 61681 | 800 | 50  |
| 11 | 835  | 62789 | 820 | 15  |
| 12 | 820  | 63938 | 460 | 360 |
| 13 | 805  | 65129 | 760 | 45  |
| 14 | 790  | 66366 | 450 | 340 |
| 15 | 775  | 67651 | 50  | 725 |
| 16 | 760  | 68986 | 200 | 560 |
| 17 | 745  | 70375 | 170 | 575 |
| 18 | 730  | 71821 | 200 | 530 |
| 19 | 715  | 73327 | 710 | 5   |

In addition to the above, any remaining tracks that cannot form up a band may be wasted. A maximum wastage may be the remaining 73326 tracks in last zone, which may be wastage of 49.999 GB (5%). If the size of the data band is 100 GB, the possible max wastage may increase to 99.999 GB (10%). Different geometry and band sizing may give different wastage. Most of the wastage may come from tracks that are unable to form up a complete data band.

More wastage may be present if data bands cannot cross zone. For example, using the table above, if Zone 0 has 60000 tracks, the remaining 7571 tracks (7.2 GB) may be wasted since they cannot form up a 50 GB data band.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A storage controller configured to control storage of data in a predetermined area of a storage medium, the storage controller comprising:
a memory storing a write pointer that indicates a location of the storage medium to write incoming data, storing a reclaim pointer that indicates a location of the storage medium to perform a space reclamation, and storing, before writing of data reaches an end of the predetermined area, a wrapped around pointer that indicates a location of the storage medium where writing is to continue if writing of data reaches the end of the predetermined area.

2. The storage controller of claim 1, further comprising:
a space reclamation circuit configured to read data at the location indicated by the reclaim pointer, configured to determine whether the data is outdated data, and to write the data to the location indicated by the write pointer if the data is not outdated data.

3. The storage controller of claim 2,
wherein the space reclamation circuit is further configured to change the reclaim pointer to indicate a location of the storage media after the location at which the data was read.

4. The storage controller of claim 2,
wherein the space reclamation circuit is further configured to change the write pointer to indicate a location of the storage media after the location at which the data was written if the data is not outdated data.

5. The storage controller of claim 1, further comprising:
an inactive data determiner configured to determine whether a region of nonoutdated data is present at the beginning of the predetermined area and further configured to change the wrapped around pointer to a location after the region of nonoutdated data if the region of nonoutdated data is present at the beginning of the predetermined area.

6. The storage controller of claim 2, further comprising:
a spare location writing circuit configured to write data to be written in the predetermined region in a spare location of the storage medium if the space reclamation circuit is not able to finish space reclamation before the data are to be written.

7. The storage controller of claim 6, further comprising:
a spare location reading circuit configured to read data from the spare location of the storage medium and write the data to the location indicated by the write pointer after the space reclamation circuit finished space reclamation.

8. The storage controller of claim 2,
wherein the space reclamation circuit is further configured to continue space reclamation at the location indicated by the wrapped around pointer if space reclamation of the space reclamation circuit reaches the end of the predetermined area.

9. The storage controller of claim 1,
wherein the storage medium comprises a shingled rotating medium.

10. The storage controller of claim 1,
wherein the memory comprises a non-volatile memory.

11. A storage control method of controlling storage of data in a predetermined area of a storage medium, the storage control method comprising:
storing, in a memory, a write pointer that indicates a location of the storage medium to write incoming data;
storing, in the memory, a reclaim pointer that indicates a location of the storage medium to perform a space reclamation; and
storing, in the memory and before writing of data reaches an end of the predetermined area, a wrapped around pointer that indicates a location of the storage medium where writing is to continue if writing of data reaches the end of the predetermined area.

12. The storage control method of claim 11, further comprising:
reading data at the location indicated by the reclaim pointer;
determining whether the data is outdated data; and
writing the data to the location indicated by the write pointer if the data is not outdated data.

13. The storage control method of claim 12, further comprising:
changing the reclaim pointer to indicate a location of the storage media after the location at which the data was read.

14. The storage control method of claim 12, further comprising:
   changing the write pointer to indicate a location of the storage media after the location at which the data was written if the data is not outdated data.

15. The storage control method of claim 11, further comprising:
   determining whether a region of nonoutdated data is present at the beginning of the predetermined area; and
   changing the wrapped around pointer to a location after the region of nonoutdated data if the region of nonoutdated data is present at the beginning of the predetermined area.

16. The storage control method of claim 11, further comprising:
   writing data to be written in the predetermined region in a spare location of the storage medium if the space reclamation is not able to be finished before the data are to be written.

17. The storage control method of claim 16, further comprising:
   reading data from the spare location of the storage medium; and
   writing the data to the location indicated by the write pointer after the space reclamation is finished.

18. The storage control method of claim 12, further comprising:
   continuing space reclamation at the location indicated by the wrapped around pointer if processing of the space reclamation reaches the end of the predetermined area.

19. The storage control method of claim 11,
   wherein the storage medium comprises a shingled rotating medium.

20. The storage control method of claim 11,
   wherein the memory comprises a non-volatile memory.

21. A tangible, non-transitory computer readable medium comprising:
   a predetermined area for storage of data;
   a write pointer that indicates a location of the predetermined area to write incoming data;
   a reclaim pointer that indicates a location of the predetermined area to perform a space reclamation; and
   a wrapped around pointer that is stored before writing of data reaches an end of the predetermined area and that indicates a location of the predetermined area where writing is to continue if writing of data reaches the end of the predetermined area.

\* \* \* \* \*